UNITED STATES PATENT OFFICE.

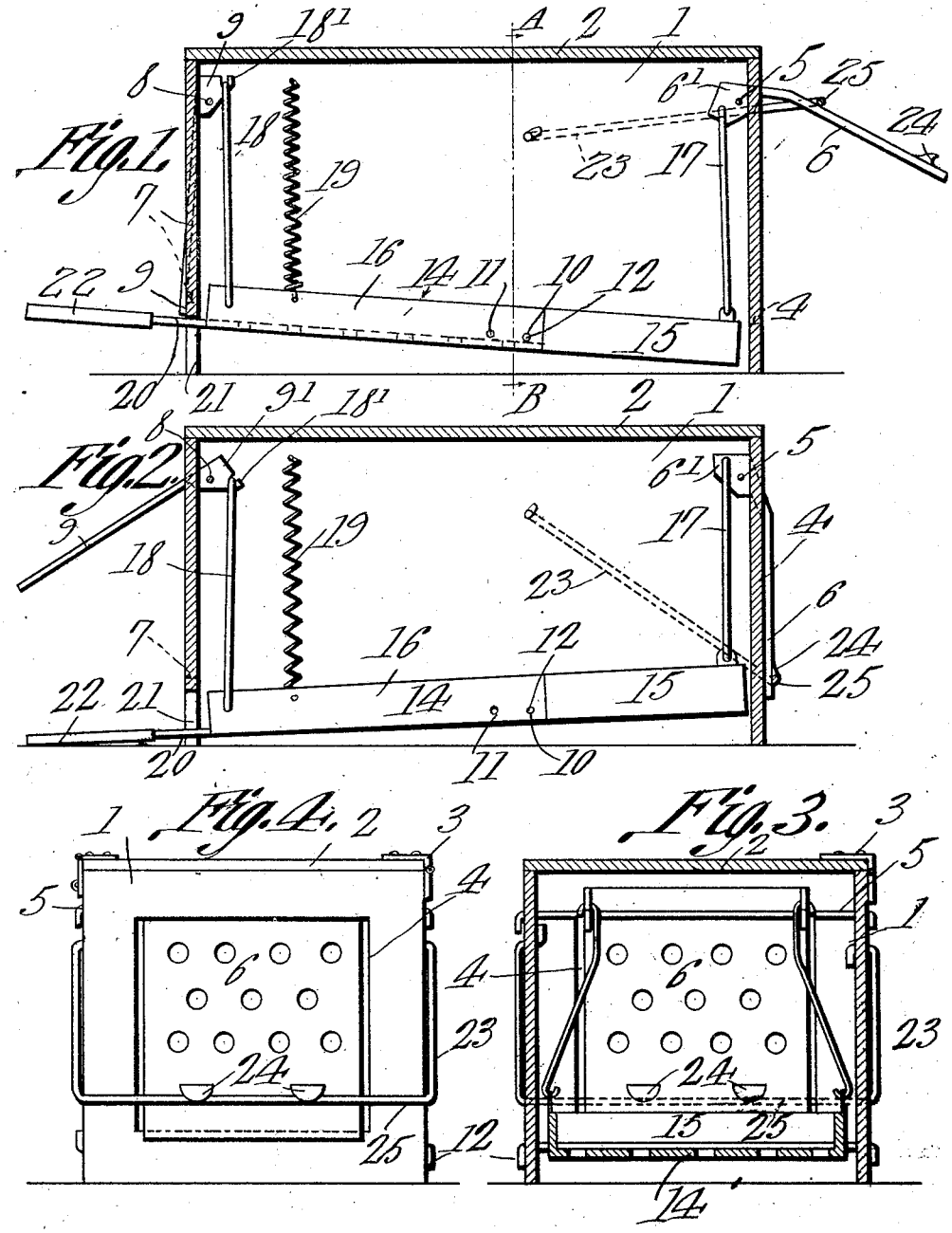

JAMES S. JORDAN, OF STAUNTON, VIRGINIA.

AUTOMATIC HEN'S NEST.

1,049,728.  Specification of Letters Patent.  Patented Jan. 7, 1913.

Application filed April 17, 1911. Serial No. 621,507.

*To all whom it may concern:*

Be it known that I, JAMES S. JORDAN, a citizen of the United States, residing at Staunton, in the county of Augusta and State of Virginia, have invented a new and useful Automatic Hen's Nest, of which the following is a specification.

It is the object of this invention to provide a nest, having pivotally mounted doors, and to provide means actuable by the animal entering the nest, to close one of said doors, and to open the other.

A further object of the invention is to provide a nest of the character above specified, so constructed that one of its doors, at the will of the operator, may be made inoperable by the tiltable member, and to provide a locking means for engaging the other door, whereby, when the animal has once entered the nest, egress therefrom will be impossible, saving when one of the doors is opened by the operator.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figures 1 and 2 are longitudinal sections; Fig. 3 is a section on the line A—B of Fig. 1; Fig. 4 is an end elevation.

In carrying out the invention, there is provided a primary and fundamental element, a case 1 having a lid 2 which, if desired, may be hingedly connected with the case 1, as shown at 3. The case 1 is provided in its opposite ends with a front door-way 4, and with a rear door-way 7. Connected with the side walls of the case 1, and extended across the front door-way 4, is a rod 5, upon which is pivoted, intermediate its ends, a vertically moving front door 6, there being inwardly extended lugs 6' upon the front door 6, through which lugs the rod 5 passes. A rod 8, terminally connected with the side walls of the case 1, is extended across the rear door-way 7, and upon this rod 8 is pivoted for vertical swinging movement, the rear door 9, there being inwardly projecting lugs 9' upon the rear door, through which lugs the rod 8 passes.

In the side walls of the case 1, adjacent the bottom thereof, there are spaced openings 10 and 11, into which is removably inserted, a rod 12, upon which is fulcrumed, intermediate its ends, and within the case 1, a tiltable member, denoted generally by the numeral 14. The front end of the tiltable member 14 is fashioned into a platform 15, hereinafter referred to as the front perch. The rear end of the tiltable member 14, is depressed to form the nest 16, the nest being, if desired, perforated, as shown. Projecting rearwardly from the nest portion 16 of the tiltable member, are rods 20, moving in slots 21 in the rear wall of the case 1, the protruding ends of the rods 20 carrying, beyond the contour of the case 1, a platform 22, hereinafter referred to as the rear perch.

Rods 17 are pivoted at their lower ends in the platform portion 15 of the tiltable member 14, the upper ends of the rods 17 being pivotally connected with the lugs 6' of the front door 6, above the rod 5 upon which the front door is pivotally suspended. Other rods 18 are pivotally connected at their lower ends with the nest portion 15 of the tiltable member 14, the upper ends of the rods 18 being fashioned into rectangularly disposed hooks 18', adapted to register removably in the lugs 9' of the rear door 9, about the rod 8 upon which the rear door is pivotally supported. Retractile springs, preferably of the helical type, are connected at their upper ends with the case 1, adjacent the top of the case, the lower ends of the springs 19 being connected with the nest portion 16 of the tiltable member 14.

A bail 23 is provided, the ends of which are pivotally mounted in the side walls of the case 1. The intermediate portion 25 of the bail 23, is adapted to extend across the front door 6, there being lugs 24 upon the front door, with which lugs the intermediate portion 25 of the bail 23 is adapted to interlock, under circumstances which will be pointed out hereinafter.

Let it be supposed that it is desired that an animal shall enter the nest at one end, and depart from the nest at the other end, the construction being such that the laying hens will be compelled to pass out the case 1 at a different end from that through which they enter, thereby separating the laying hens from the non-laying hens. Under such circumstances, the operation of the device is as follows: The bail 23 is swung upwardly, to rest across the lid 2, the bail, under such circumstances being effective to serve as a means for locking the front door 6. The springs 19, tilting the nest end 16 of the member 14 upwardly, will depress the platform end 15 of the member 14, the rods 17 tilting the front door 6 upon the rod 5, into an open position. The elevating of the nest end 16 of the tiltable member 14, through the action of the springs 19, will serve to swing the rear door 9 into closed position. The hen, entering through the open front door-way 4, will pass from the front perch 15 into the nest 16, thereby depressing the nest, and putting the springs 19 under tension. This tilting of the member 14 will serve to elevate the portion 15 of the member 14, thereby swinging the front door 6 into a closed position. The depression of the nest end 16 of the member 14, due to the presence of the hen in the nest, will cause the rear door 9 to swing into open position. When the hen leaves the nest, and steps from the rear perch 22, the springs 19 will elevate the nest end 16 of the member 14, causing an elevation of the nest end 16 of the member 14, thereby swinging the rear door 9 into closed position. The consequent depression of the platform 15 of the tiltable member 14 will operate to swing the front door 6 into open position, whereupon the nest will be positioned for further occupancy.

In case it is desired to employ the nest as a trap nest, the bail 23 is swung downwardly, until its intermediate portion 24 rests upon the front door 6, the front door being in open position. The upper ends of the rods 18 are removed from the openings in the lugs 9' of the rear door 9, the said rods being permitted to drop downwardly, to one side of the nest 15. When the animal enters the front door-way 4, and passes into the nest 16, the front door 6 will be swung into closed position, the intermediate portion 25 of the bail 23 engaging beneath the lugs 24 which are upon the door 6, the door 6 being thus held in closed position. However, owing to the fact that the rods 18 have been disconnected from the rear door 9, the rear door 9 will not be opened by the depression of the nest 16, when the hen enters the same. Under such circumstances, the hen will remain entrapped within the nest, until one or the other of the doors is opened manually.

The foregoing operation presupposes that the door 9 is sufficiently heavy so that the hen cannot readily push the door 9 into an open position. In any event, the device will act efficiently as a trap nest, since the hen will not be likely to force open a closed barrier, such as the door 9. The device may likewise be so manipulated that the hen will be compelled to enter the nest through the front door-way 4, and to depart from the nest in the same way. Under such circumstances, the bail 23 is swung upwardly across the lid 2, and the rods 18 are disconnected from the rear door 9, in the manner hereinbefore described. Under such circumstances, the rear door 9 will remain continually closed, the front door 6 to be closed when the hen enters the nest, and being opened when the hen leaves the nest. Under such circumstances, it is desirable to remove the fulcrum rod 12 from the forward openings 10 and to insert the rod in the rear openings 11. This operation gives the platform end 15 of the tiltable member 14 a longer power arm, whereby the weight of the hen upon the platform 15 will be rendered more effective to depress the platform end of the tiltable member, whereby at 15 the springs 19 will effect an opening of the front door 6.

Having thus described the invention, what is claimed is:—

1. In a device of the class described, a case; vertically swinging front and rear doors pivoted intermediate their ends to the case; a tiltable member disposed within the case, and pivoted intermediate its ends to the case, one end of the tiltable member being extended beyond the rear end of the case; a retractile spring connected at its upper end to the case, and connected at its lower end with the tiltable member, between the fulcrum of the tiltable member and the rear end of the case; a connection pivotally uniting one end of the tiltable member with the front door, above the pivotal mounting of said door; a connection pivotally united with the tiltable member, adjacent the other end of said tiltable member, the said connections being detachably secured to the rear door, above the pivotal mounting of said door, whereby the rear door may be rendered inoperable, at will, by the tiltable member; and a bail terminally pivoted to the case and having its intermediate portion extended across the front door, there being a projection upon said front door, with which the intermediate portion of the bail is adapted to interlock.

2. A device of the class described comprising a case; a tiltable member fulcrumed intermediate its ends in the case; a rear door for the case; a front door for the case; both of said doors being vertically movable in a common direction with the tiltable member; separate connections between opposite ends of the tiltable member and said doors, whereby the tilting of said member in one direction will operate to open one door and to close the other, the connection which unites the tiltable member with the rear door, being detachably secured to said door, whereby said door only may be rendered inoperable by the tiltable member; means for elevating one end of the tiltable member, thereby to maintain the rear door normally closed, and to maintain the front door normally open; and a case-carried locking device, adapted to engage with the front door, when the same is swung into closed position, to hold said door in closed position.

3. A device of the class described comprising a case; a tiltable member fulcrumed intermediate its ends in the case; front and rear doors for the case; both of said doors being pivotally supported upon the case, intermediate their ends, and both of said doors having vertical swinging movement; separate connections directly uniting the doors with opposite ends of the pivotal member, whereby but one door at a time will be maintained in closed position; and means for elevating one end of the pivotal member.

4. A device of the class described comprising a case; a tiltable member fulcrumed intermediate its ends in the case; vertically swinging doors pivoted to opposite ends of the case; separate connections between the doors and the tiltable member, on opposite sides of the fulcrum of the tiltable member whereby swinging movement will be imparted to the doors alternately, by the tiltable member; and means located above the tiltable member for elevating one end of the tiltable member.

5. A device of the class described comprising a case; a tiltable member fulcrumed intermediate its ends in the case; one end of the tiltable member being extended beyond one end of the case; vertically swinging doors pivoted to opposite ends of the case; means for operatively connecting the doors with the tiltable member, upon opposite sides of its fulcrum; and means for maintaining one end of the tiltable member normally uplifted.

In testimony that I claim the foregoing as my own, I have hereto affixed my signature in the presence of two witnesses.

JAMES S. JORDAN.

Witnesses:
HARRY BURNETT,
EMMITT L. GOODWIN.